United States Patent [19]

Sato

[11] Patent Number: 4,530,208
[45] Date of Patent: Jul. 23, 1985

[54] FLUID CIRCULATING SYSTEM

[76] Inventor: Shigeki Sato, 72 kanta shimoayash Miyagi-cho, Miyagi, Miyagi, Japan

[21] Appl. No.: 473,284

[22] Filed: Mar. 8, 1983

[51] Int. Cl.³ .............................................. F03G 7/06
[52] U.S. Cl. ...................................... 60/516; 60/527; 60/530; 60/325
[58] Field of Search ............... 60/527, 530, 531, 325, 60/516; 417/379

[56] References Cited

U.S. PATENT DOCUMENTS

| 3,608,311 | 9/1971 | Roesel, Jr. | 60/516 |
| 3,732,040 | 5/1973 | Low et al. | 60/531 X |
| 3,890,784 | 6/1975 | Tubeve | 60/516 |
| 3,937,019 | 2/1976 | Renner | 60/527 |
| 3,984,985 | 10/1976 | Lapeyre | 60/530 X |
| 4,031,704 | 6/1977 | Moore et al. | 60/527 X |
| 4,195,481 | 4/1980 | Gregory | 60/670 |

Primary Examiner—Allen M. Ostrager
Attorney, Agent, or Firm—Pahl, Lorusso & Loud

[57] ABSTRACT

A fluid circulating system includes a thermal differential engine having a pair of expansion-contraction vessels each containing an expansion component expansible with heat for discharging fluid to a delivery line when heated and drawing fluid from a return line when cooled. Heated water is supplied alternatively to the pair of vessels to circulate the fluid through the delivery and return lines. The pair of expansion-contraction vessels are identical in volume and other characteristics and have multiple ports connected to anti-convectional valves and change-over valve.

20 Claims, 14 Drawing Figures

FLUID CIRCULATING SYSTEM

BACKGROUND OF THE INVENTION

This invention relates to a fluid circulating system including a thermal differential engine having a pair of expansion-contraction vessels each containing an expansion component expansible with heat for discharging fluid when heated and drawing in fluid when cooled.

Fluid circulating systems have been provided for circulating hot water through an air conditioner, drawing ground water from a well, and other applications. Such conventional systems require a pump driven by an electric power source for circulating fluid therethrough. For use in places where no electric power source is available, however, a special power source is required, resulting in a complex and expensive fluid circulating system.

SUMMARY OF THE INVENTION

There is provided, in accordance with the present invention, a fluid circulating system which includes first and second expansion-contraction vessels each being operable to discharge fluid therefrom through an outlet with temperature increase and to intake fluid through an inlet with temperature decrease. The inlets of the expansion-contraction vessels are interconnected as are their outlets. A source of heated fluid supplies heated fluid under pressure through a valve alternatively to one or the other of the first and second expansion-contraction vessels to heat the same in response to a temperature differential between the first and second vessels.

DESCRIPTION OF THE PREFERRED EMBODIMENTS

Figure 1:
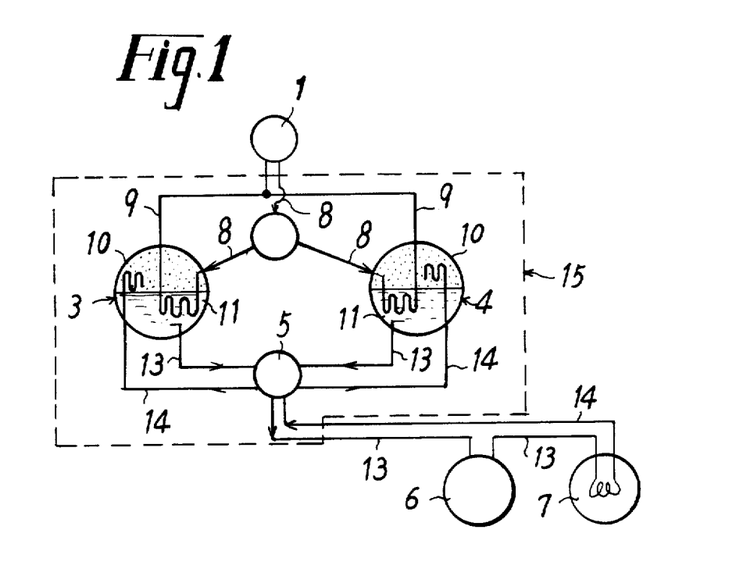
FIG. 1 is a schematic circuit diagram showing the principles of the present invention.

Referring now in greater detail to the drawings, FIG. 1 illustrates one embodiment of a fluid circulating system made in accordance with the present invention. The fluid circulating system comprises a heat source 1 from which a heated fluid is delivered through a line 8 to first and second expansion-contraction vessels 3 and 4 each of which contains an expansion component 10 and a working fluid 11 and operates with changing temperatures to discharge and intake the working fluid 11. The line 8 has therein a change-over valve 2 which connects the heat source 1 with the first and second expansion-contraction vessels 3 and 4 alternatively. A delivery line 13 leads from each of the first and second expansion-contraction vessels 3 and 4 to an output section 6 and then to a heat exchanger 7 from which a return line 14 leads to each of the first and second expansion-contraction vessels 3 and 4. An anti-convectional valve unit 5 is located in the delivery and return lines 13 and 14. The anti-convectional valve unit 5 permits flow through the dilivery line 13 in a direction form the first and second expansion-contraction vessels 3 and 4 to the output section 6 but not vice versa and also permits flow through the return line 14 in a direction from the heat exchanger 7 to the first and second expansion-contraction vessels 3 and 4 but not vice versa. The anti-convection valve unit 5 prevents heat transfer across it when there is no fluid flow through the lines. Reference numeral 15 designates a thermal differential engine.

In operation, when the heated fluid from the heat source 1 is delivered through the change-over valve 2 into the first expansion-contraction vessel 3, the heated fluid transfers heat to the expansion component 10 which thereby expands to increase the pressure in the first expansion-contraction vessel 3 and pressurize the working fluid 11. The working fluid 11 under pressure is delivered from the first expansion-contraction vessel 3 through the delivery line 13 to the anti-convectional valve unit 5 and then to the output section 6 which utilizes the flow of the working fluid to perform external work. The working fluid is then delivered from the output section 6 to the heat exchanger 7 where heat released from the working fluid. The cooled working fluid from the heat exchanger 7 is delivered through the anti-convectional valve unit 5 into the second expansion-contraction vessel 4 in which the cooled fluid cools and pressurizes the expansion component 10 which thereby contracts to decrease the pressure in the second expansion contraction vessel 4, causing additional cooled fluid to enter the second expansion-contraction vessel 4 from the return line 14. The additional cooled fluid further cools and pressurizes the expansion component 10 which thereby further contracts to draw additional cooled fluid into the second expansion-contraction vessel 4 from the return line 14. This is repeated until an equilibrium state is reached in vessel 4. At this point, the first expansion-contraction vessel 3 is higher in temperature than the second expansion-contraction vessel 4. Such temperature differential between the first and second expansion-contraction vessels 3 and 4 is utilized to operate the change-over valve 2. When a suitable temperature differential is reached, the change-over valve 2 moves to another position where the heat source 1 is disconnected from the first expansion-contraction vessel 3 and is connected to the second expansion-contraction vessel 4. As a result, the second expansion-contraction vessel 4 receives a supply of heated fluid from the heat source 1 through the change-over valve 2. The heated fluid transfers heat to the expansion component 10 which thereby expands to increase the pressure in the second expansion-contraction vessel 4 and pressurize the working fluid 11. The working fluid under pressure is delivered from the second expansion-contraction vessel 4 through the delivery line 13 to the anti-convectional valve unit 5 and thereafter through the output section 6 to the heat exchanger or heat exhaust means 7 where heat exchange occurs to release heat from the working fluid exiting. The cooled working fluid the heat exchanger 7 is delivered through the anti-convectional valve unit 5 into the first expansion-contraction vessel 3 in which the cooled fluid cools and pressurizes the expansion component 10 which thereby contracts to decrease the pressure in the first expansion-contraction vessel 3, causing additional cooled fluid to enter the first expansion-contraction vessel 3 from the return line 14. When a suitable temperature differential is reached, the change-over valve 2 moves to the initial position where the heat source is disconnected from the second expansion-contraction vessel 4 and is connected to the first expansion-contraction vessel 4. These operations are repeated.

Figure 2:
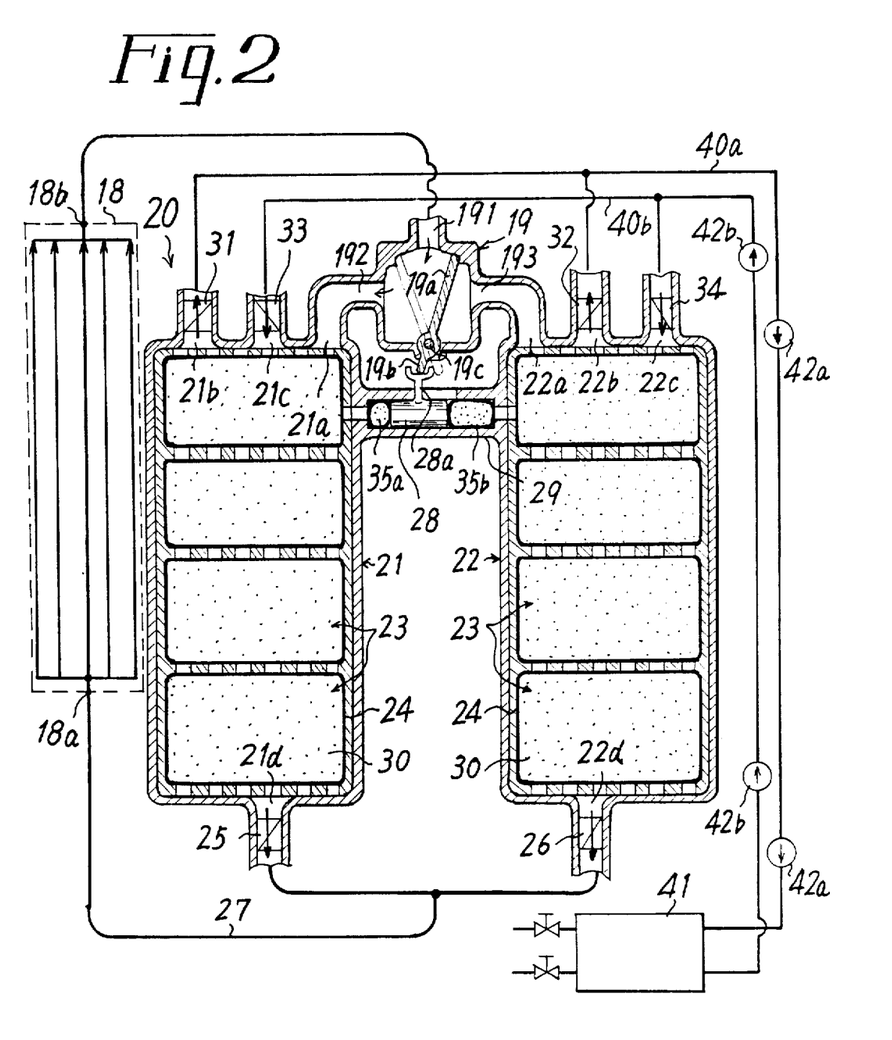
FIG. 2 is a diagram, partially in section, showing one embodiment of a fluid circulating system made in accordance with the present invention.

Referring to FIG. 2, it will be seen that reference numeral 18 designates a solar collector wherein water is heated to an elevated temperature while circulating through a plurality of pipes arranged therein. The solar collector 18 has an inlet 18a and an outlet 18b across which a thermal differential engine indicated generally as 20, is connected. The thermal differential engine 20 comprises first and second expansion-contraction vessels 21 and 22, and a change-over valve 19 operable to connect the solar collector outlet 18b selectively to one of the first and second expansion-contraction vessels 21 and 22. The first and second expansion-contraction vessels 21 and 22 contain expansion components having identical qualities and volumes. Each of the expansion components transfers its expansion to the working fluid to discharge the working fluid from the corresponding expansion-contraction vessel when heated by introduction of heated fluid and transfer its contraction to the working fluid when cooled by introduction of cooled fluid. The change-over valve 19 is a three-way valve having a valve member 19a pivoted at 19c from which a lever 19b extends outwardly. The valve member 19a is rotable between the full line position shown and the dotted line position. The change-over valve 19 has an inlet 191 communicating with the solar collector outlet 18b, and first and second outlets 192 and 193 respectively communicating with the first and second expansion-contraction vessels 21 and 22. The valve member 19a connects the inlet 191 to the first outlet 192 when it is in the full line position and to the second outlet 193 when it is the dotted line position.

The first expansion-contraction vessel 21 contains an expansion component which is in the form of four expansion bags 24 expansible with heat which together form a expansion-contraction chamber whose volume varies with temperature changes. Each of the expansion bags may be a rubber bag charged with a gas 30 such for example as air, argon gas, phlone gas, hydrogen gas, and the like. Alternatively, the expansion bags may be charged with a liquid such for example as acetone, alcohol, and the like. It is to be noted, of course, that the expansion bags may be replaced with another member, such as a combination of a bimetal and a diaphram, expansible with heat to form an expansion-contraction chamber whose volume varies with temperature changes. Which one of the various types expansion components is to be selected is determined by the application of the system, heating fluid temperature, working fluid temperature, and other factors.

The first expansion-contraction vessel 21 has three ports 21a, 21b and 21c in its top wall and a return port 21d in its bottom wall. The return port 21d is connected to the solar collector inlet 18a through an anti-convectional valve 25 which permits flow from the first expansion-contraction vessel 21 to the solar collectors 18 but not vice versa. The intake port 21a communicates with the change-over valve first outlet 192. The delivery port 21b is connected through an anti-convectional valve 31 to a delivery line 40a which leads to a heat exchanger 41. The delivery line 40a has a plurality of anti-convectional valves 42a positioned therein substantially at equal distances to prevent convection resulting from temperature differential between different points in the line 40a. Each of the anti-convectional valves 31 and 42a is effective to permit flow in direction toward the heat exchanger 41 but not a vice versa.

Figure 3:
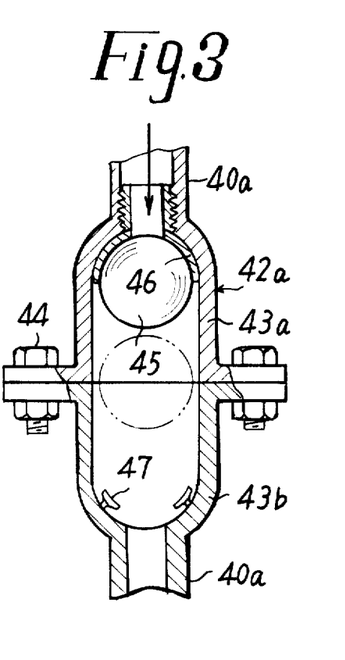
FIGS. 3 and 4 are sectional views showing the anti-convectional valves used in the system of FIG. 2.

Referring to FIG. 3, each of the anti-convectional valves 42a includes upper and lower housings 43a and 43b secured in unison to each other by means of bolts 44 to form therein a valve chamber within which a spherical valve element 45 is placed for engagement with an upper seat 46 or a lower seat 47, depending upon the pressure differential across the valve element 45. The upper seat 46 is formed on the upper housing inner surface so that the valve element 45 can rest against the upper seat 46 to prevent flow in the upward direction, as viewed in FIG. 3, from the heat exchanger 41. The lower seat 47 is relation spaced relation from the lower housing inner surface so as to permit flow in the direction of the arrow toward the heat exchanger 41 when the valve element 45 is seated on the lower seat 47. The valve element 45 is made of an elastic material whose density is smaller than that of the fluid (heated water in this embodiment) flowing through the anti-convectional valve 42. The upper and lower housings 43a and 43b and made of an insulating material such for example as synthetic resin, ceramic, and the like.

Returning to FIG. 2, the return port 21c is connected through an anti-convectional valve 33 to a return line 40b which leads from heat exchanger 41. The return line 40b has therein a plurality of anti-convectional valves 42b positioned therein substantially at equal distances to prevent convection resulting from a temperature differential between different points in the line 40b. Each of the anti-convectional valves 33 and 42b is effective to permit flow in a direction away from the heat exchanger 41 but not vice versa.

Figure 4:
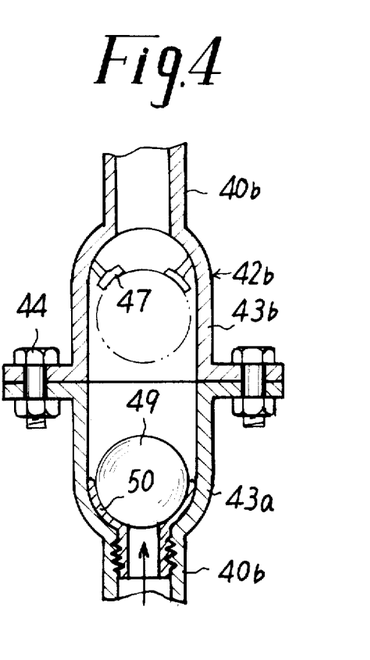

Referring to FIG. 4, each of the anti-convectional valves 42b includes upper and lower housings 43a and 43b secured in unison to each other by means of bolts 44 to form therein a valve chamber within which a sperical valve element 49 is placed for engagement with an upper seat 47 or a lower seat 50, depending upon the pressure differential across the valve element 49. The upper seat 47 is formed spaced from the upper housing inner surface so as to permit flow in the direction of the arrow away from the heat exchanger 41 when the valve element 49 is seated on the upper seat 47. The lower seat 50 is formed on the lower housing inner surface so that the valve element 49 can rest against the lower seat 50 to prevent flow in the downward direction, as viewed in FIG. 4, toward the heat exchanger 41. The element 49 is made of an elastic material whose density is smaller than that of the fluid (heated water in this embodiment) flowing through the anti-convectional valve 42b. The upper and lower housings 43a and 43b are made of a heat-insulating material such as synthetic resin, ceramic, and the like.

Returning again to FIG. 2, the second expansion-contraction vessel 22 is substantially the same in structure as the first expansion-contraction vessel 21. The second expansion-contraction vessel 22 has three ports 22a, 22b and 22c in its top wall and an outlet port 22d in its bottom wall. The return port 22d is connected to the solar collector inlet 18a through an anti-convectional valve 26 which permits flow from the second expansion-contraction vessel 22 to the solar collector 18 but not vice versa. The intake port 22a communicates with the change-over valve second outlet 193. The delivery port 22b is connected to the delivery line 40a through an anti-convectional valve 32 which permits flow from the second expansion-contraction vessel 22 to the delivery line 40a but not vice versa. The return port 22c is connected to the return line 40b through an anti-convectional valve 34 which permits flow from the return line 40b to the second expansion-contraction vessel 22 but not vice versa.

The thermal differential engine 20 also includes a cylinder 29 which contains a piston 28 for reciprocating movement therein to form, at its opposite ends, chambers respectively communicating with the first and second expansion-contraction vessels 21 and 22. The end chambers of cylinder 29 contain expansion bags 35a and 35b which are extensible with heat. The piston 28 is operatively connected to the valve member 19a through a connecting rod 28a joined to the lever 19b of the valve member 19a. Preferably, the first and second expansion-contraction vessels 21 and 22 and the delivery and return lines 40a and 40b are covered with a heat-insulating material to prevent heat from emitting to the exterior which effectively improves the efficiency of the heat exchanger.

The operation is as follows. Assuming now that the change-over valve 19 is in the full line position as shown in FIG. 2, heated water from the solar collector 18 is delivered under natural convection into the change-over valve 19, the intake port 21a, the first expansion-contraction vessel 21 and the outlet port 21d from which the water returns to the solar collector 18 through the anti-convectional valve 25. The water from the valve 25 cannot enter the second vessel 22 because of the presence of the valve 26. While passing through the first vessel 21, the heated water transfers heat to the expansion bags 24 which thereby expand to increase the pressure in the first vessel 21 and at the same time restrict the flow to the outlet port 21d. As a result, the remaining heated water under pressure is delivered from the delivery port 21b through the valve 31 to the delivery line 40a and hence through the valves 42a to the heat exchanger 41 where heat exchmge occurs under natural convection and/or forced convection to transfer heat from the heated water to a suitable material charged in the heat exchanger 41. The heated water from the first vessel 21 cannot enter the return line 40b due to the presence of the valve 33.

The cooled water, discharged under a constant pressure from the heat exchanger 41 into the return line 40b, returns to the first vessel 21 through the valve 33 and also enters the second vessel 22 through the valve 34. This results in a temperature decrease in the second vessel 22 whereas there appears substantially no change in the temperature of the first vessel 21 which receives a continuous supply of heated water from the solar collector 18. The cooled water delivered under a constant pressure into the second expantion-contraction vessel 22 cools and presses the expansion bags 24 which thereby cont to decrease the pressure in the second vessel 22, causing additional cooled water to enter the second vessel 22 from the return line 40b so as to maintain the second vessel 22 at a given pressure. Although the first and second vessels 21 and 22 are maintained at the same pressure by the function of the check valves, the first vessel 21 is higher in temperature than the second vessel 22. Thus, the expansion bag 35a expands and the expansion bag 35b contracts, whereby a pressure differential is created across the piston 28 to urge the piston to the right, as viewed in FIG. 2, causing the valve member 19a to move to the dotted line position where communication is established between the solar collector 18 and the second vessel 22. As a result, the heated water from the solar collector 18 is delivered into the change-over valve 19, the intake port 22a, the second expansion-contraction vessel 22 and the outlet port 22d from which the water returns to the solar collector 18 through the anti-convectional valve 26. The water from the anti-convectional valve 26 cannot enter the first expansion-contraction vessel 21 due to the presence of the anti-convectional valve 25. The cooled water, which has entered the second expansion-contraction vessel 22, is rapidly heated to an elevated temperature by the heated water delivered from the solar collector 18. While passing through the second expansion-contraction vessel 22, the heated water transfers heat to the expansion bags 24 which thereby expand to increase the pressure in the first expansion-contraction vessel 22 and at the same time restrict the flow through the outlet port 22d. Consequently, the remaining heated water under pressure passes through outlet port 22d, through the anti-convectional valve 32 to the delivery line 40a and then through the anti-convectional valves 42a to the heat exchanger 41. The heated water from the second expansion-contraction vessel 22 cannot enter the return line 40b because of the presence of the anti-convectional valve 34. Heat exchange occurs in the heat exchanger 41 under natural convection and/or forced convection to transfer heat from the heated water to the material charged in the heat exchanger 41.

The cooled water, discharged under a constant pressure from the heat exchanger 41 into the return line 40b, returns to the second expansion-contraction vessel 22 through the anti-convectional valve 34 and also enters, under a constant pressure, the first expansion-contraction vessel 21 through the anti-convectional valve 33. This results in a temperature decrease in the first expansion-contraction vessel 21 whereas substantially no change occurs in the temperature of the second expansion-contraction vessel 22 into which the heated water is continuously delivered from the solar collector 18.

The cooled water delivered under a constant pressure into the first expansion-contraction vessel 21 cools and presses the expansion bags 24 which thereby contract to decrease the pressure in the first expansion-contraction vessel 21, causing additional cooled water to enter the first expansion-contraction vessel 21 from the return line 40b. Although the first and second expansion-contraction vessels 21 and 22 are maintained at the same pressure by the function of the anti-convectional valves, the first expansion-contraction vessel 21 is lower in temperature than the second expansion-contraction vessel 22. Thus, the expansion bag 35a contracts and the expansion bag 35b expands, whereby a pressure differential is produced across the piston 28 to urge the piston to the left, as viewed in FIG. 2, causing the valve member 19a to move to the full line position where communication is provided between the solar collector 18 and the first expansion-contraction vessel 22. These operations are repeated.

In the nighttime when the solar collector 18 is cooled rapidly to a temperature lower than that of the material charged in the heat exchanger 41, the possibility exists that heat may be transferred by natural convection and heat conduction from the heat exchanger 41 to the relatively cooler thermal differential engine 20 through the delivery and return lines 40a and 40b and also through the fluid therein. The present invention avoids that possibility by the provision of the anti-convectional valves 42a located in the delivery line 40a and the anti-convectional valves 42b located in the return line 40b. Since the valve element 45 placed in each anti-convectional valve 42a has a density less than that of the fluid flowing therethrough and no fluid flow exists through the delivery line 40a, the valve element 45 rests on the upper valve seat 46 to prevent heat transfer and convection through the fluid. Furthermore, the valve housings 43a and 43b are made of heat-insulating material to prevent heat transfer through the anti-convectional valve 42a. Similarly, each anti-convectional valve 42b whose valve element 49 rests on the lower valve seat 50 is effective to prevent heat transfer and convection through the return line 40b and the fluid therein.

Figure 5:
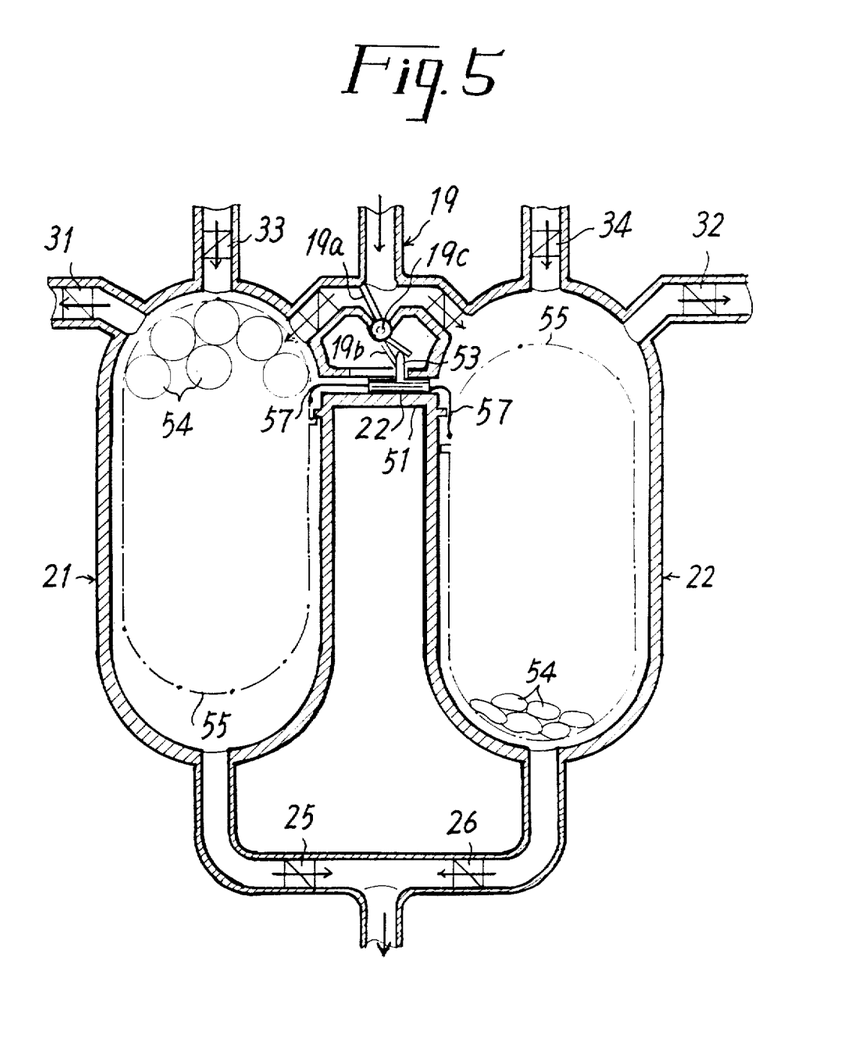
FIG. 5 is a sectional view showing a modified form of the thermal differential engine used in the system of FIG. 2.

Referring to FIG. 5, a modified form of the thermal differential engine 20 is illustrated wherein like reference numerals have been applied to FIG. 5 with respect to the equivalent components shown in FIG. 2. The engine has first and second expansion-contraction vessels 21 and 22 connected to each other through a cylinder 51 which contains a piston 52 for reciprocating movement therein. The piston 52 is connected to drive the valve member 19a through a connecting rod 53 joined through the bifurcated portion 19b to the valve member 19a. Each of the first and second expansion-comtraction vessels 21 and 22 contains a net sack 55 which encloses therein a plurality of ball-shaped small expansion bags 54 expansible with heat. The expansion bags 54 may be formed of flexible casing material such as rubber and charged with a gas such as air, argon gas, phlone gas, and the like. When the expansion bags 54 expand under heat, they move upward to the top of the net sack 55 and then further move upward together with the net sack 55 to the top of the chamber. The net sacks 55 are respectively connected through connecting members 57 to the opposite ends of the piston 52.

Assuming now that the change-over valve 19 is in a position connecting the heat source to the first expansion-contraction vessel 21, the expansion bags 54 expand and move upward to bring the net sack 55 toward the top of the first chamber, whereas in the second vessel 22, the expansion bags 54 contract and move downward to bring the net sack 55 toward the botton of the second chamber. When the net sacks 55 occupy their positions as shown in FIG. 5, the piston 52 moves to the right, as viewed in FIG. 5, so as to rotate the valve member 19 to the position shown, permitting heated water to enter the second expansion-contraction vessel 22 and to heat the expansion bags 54 in the second chamber. As a result, the second net sack 55 moves upward to the top of the second chamber and the first net sack 55 moves downward to the bottom of the first chamber. This causes the piston 52 to move to the left and thus return the valve member 19 to its initial position. These operation are repeated.

Figure 6:
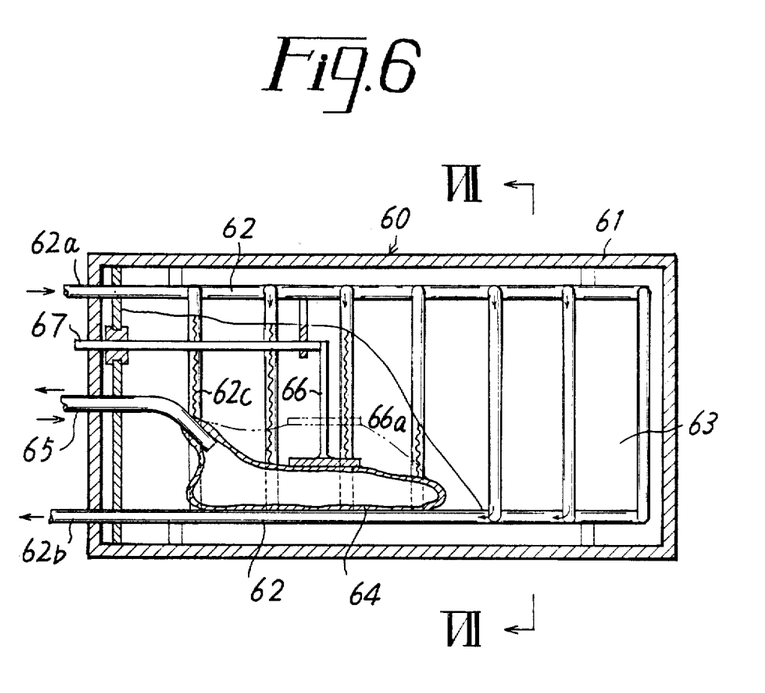
FIGS. 6 and 7 are sectional views showing a modified form of the expansion-contraction vessel used in the system of FIG. 2.
Figure 7:
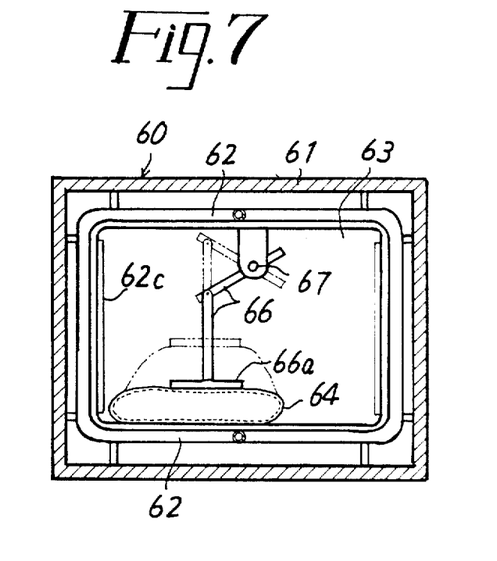
Figure 8:
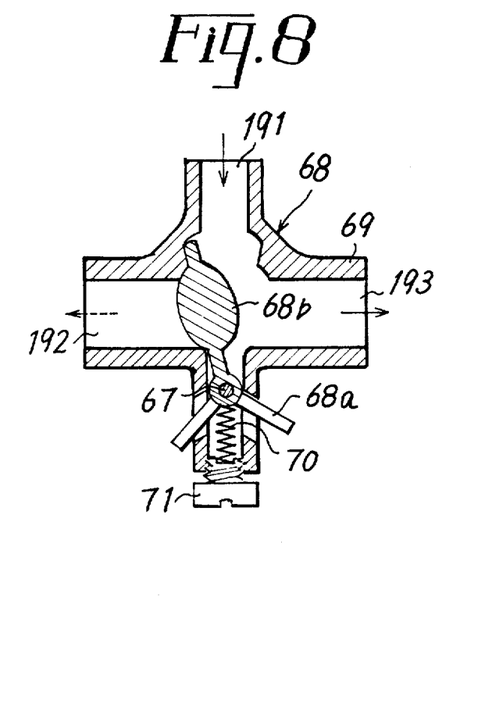
FIG. 8 is a sectional view showing a change-over valve used with the pump vessels of FIGS. 6 and 7.

Referring to FIGS. 6 to 8, another modified form of the expansion-contraction vessel is illustrated wherein the vessel comprises a pair of similar casings, one of which is shown at 61. The casings are connected and connected the same manner as described in connection with FIGS. 2 and 5. An expansion fluid 63, which may be a liquid or liquefied gas, such as ammonia, propane, and the like, is sealed in each casing 61. A pipe network 62 is arranged along the inner surface of the casing 61. The pipe network 62 has an inlet 62a connected to the change-over valve first or second outlet 192 or 193 and an outlet 62b connected through the anti-convectional valve 25 or 26 to the solar collector 18 (FIG. 2). An expansion bag 64 which is made of a heat-insulating material such as rubber, is located within the pipe network 62. The expansion bag 64 is connected to a pipe 65 which is in turn connected through the valve 31 or 32 to the delivery line 40a and also through the valve 33 or 34 to the return line 40b (FIG. 2). It is preferable to provide a number of fins 62c on the pipe network 62 to facilitate heat radiation therefrom.

Referring to FIG. 8, a change-over valve is illustrated which is suitable for use with the engine structure of FIGS. 6 and 7. The change-over valve 68 comprises a valve housing 69 provided with an inlet 191 connected to the heat source 18 (FIG. 2), and first and second outlets 192 and 193 respectively connected to the first vessel 60 (FIG. 6), and second vessel (not shown). A valve member 68b, which has a pair of levers 68a extending therefrom in different directions, is secured on a valve shaft 67 for rotation in unison therewith between two positions, the first position resulting in the valve member 68b providing communication between the inlet 191 and the first outlet 192. In the second position, illustrated in FIG. 8, the valve member 68b provides communication between the inlet 191 and the second outlet 193. A spring 70 urges one of the levers 68a to apply an eccentric force to the valve member 68 so as to rotate the valve member 68 to one of that first and second positions and hold it in the position. Rotation of the valve shaft 67 through an angle in a counter-clockwise direction moves the top end of the spring 70 from the left-hand lever 68a to the right-hand lever 68a to rotate the valve member 68b to the second position as shown in FIG. 8. The force of the spring 70 is adjusted by means of an adjusting screw 71.

Returning to FIGS. 6 and 7, the valve shaft 67 is rotated by a link mechanism 66 which terminates in a plate 66a placed on the expansion bag 64. Expansion or contraction of the expansion bag 64 moves the plate 66a upward or downward, causing the valve shaft 67 to rotate in a clockwise or counter-clockwise direction.

When heated fluid is introduced into the pipe network 62 through the change-over valve 68 from the solar collector, the heated fluid transfers heat to the expansion fluid 63 which thereby expands to increase the pressure in the casing 61. As a result, the expansion bag 64 contracts to discharge the working fluid under a constant pressure through the anti-convectional valve to the delivery line 40a. When no heated fluid is introduced into the pipe network 62, the expansion fluid 63 contracts to decrease the pressure in the casing 61. As a result, the expansion bag 64 expands to draw the working fluid under a constant pressure through the anti-convectional valve from the return line 40b and also to rotate the valve shaft 67 through the link mechanism 66. When the valve shaft 67 rotated through a small angle, the spring 70 moves over the valve shaft 67 to provide an eccentric force on valve lever 68a, moving the valve element 68b to another position. The pump structure of this embodiment may be used to perform external work utilizing the force of flow of the working fluid discharged from and drawn into the expansion bags 64.

Figures 9, 11:
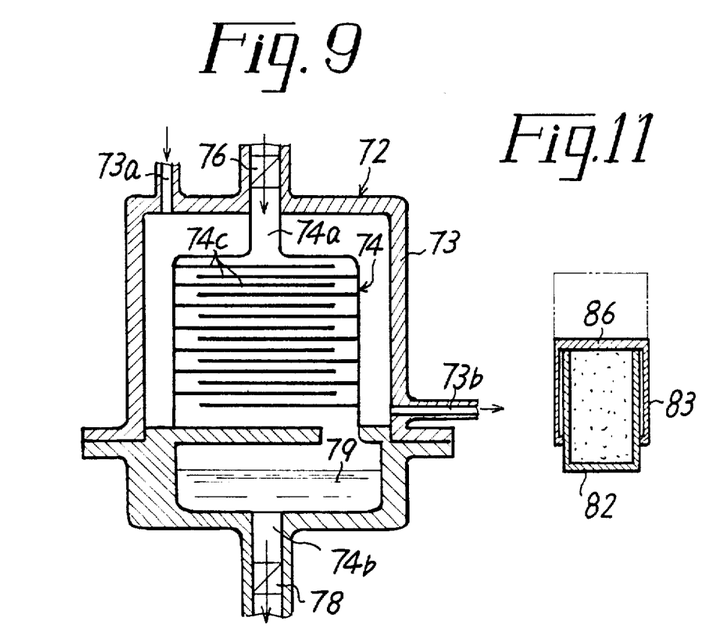
FIG. 9 is a sectional view showing another modified form the expansion-contraction vessel used in the system of FIG. 2.
FIG. 11 is a sectional view showing another modified form of the expansion component.

Referring to FIG. 9, another modified form of the expansion-contraction vessel is illustrated wherein the working fluid flows through a path separated from the flow of the heating fluid. The engine includes a pair of expansion-contraction vessels, one of which is shown at 72. The expansion-contraction vessel 72 includes an outer casing 73 in which an inner casing 74 is placed. The outer casing 73 is provided in its top wall with an intake port 73a connected to the change-over valve first or second outlet 192 or 193 (FIG. 2) and in its side wall with an outlet port 73b connected through the anti-convectional valve to the solar collector 18 (FIG. 2). The inner casing 74 is formed in its top wall with a return port 74a extending outwardly through the top wall of the outer casing 73. The return port 74a is connected to the return line 40b (FIG. 2) through an anti-convectional valve 76 which permits flow in a direction toward the inner casing 74 but not vice versa. The inner casing 74 is provided with a bottom delivery port 74b extending outwardly through the bottom wall of the delivery casing 73. The outlet port 74b is connected to the delivery line 40a (FIG. 2) through an anti-convectional valve 78 which permits flow in a direction away from the inner casing 74 but not vice versa. The inner vessel 74 has a number of fins 74c extending parallel with each other inwardly from its sides to facilitate heat transfer. The outer casing 73 is made of a heat-insulating material. The reference numeral 79 designates a working fluid such as water or oil stored in the bottom portion of the inner casing 74.

When the heating fluid is supplied into the outer casing 73 from the solar collector, its heat is transferred to the inner casing 74 to expand the gas in the inner vassel 74. As a result, the working fluid, stored in the lower portion of the inner casing 74 is discharged under a constant pressure through the delivery port 74b. When the supply of the heating fluid to the outer casing 73 is terminated, the temperature decreases in the outer casing 73 to cool the inner casing 74. As a result, the gas in the inner casing 74 contracts to decrease the pressure therein to thereby draw the working fluid under a constant pressure through the return port 74a. These operations are repeated to circulate the working fluid.

It is to be noted that the working fluid may be circulated by using the expansion-contraction vessel 72 of FIG. 9 in connection with a means which can supply heated fluid and cooled fluid alternatively at time intervals to the outer casing 73.

Figure 10:
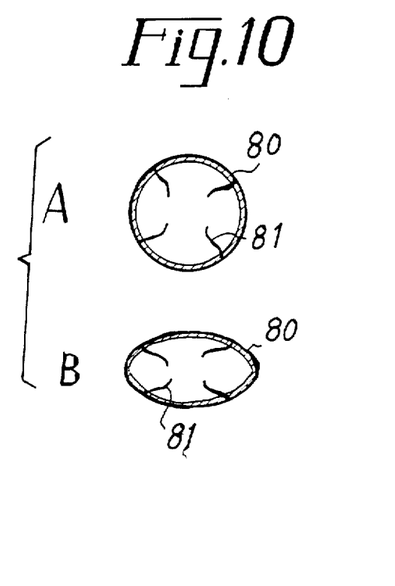
FIG. 10 is a sectional view showing a modified form of the expansion component used in the system of FIGS. 2 and 5.

Referring to FIG. 10, there is illustrated a modified form of the expansion component for use in the fluid circulating systems of FIGS. 2 and 5. FIG. 10a shows the expansion component 80 in an expanded condition and FIG. 10b shows the expansion component 80 in a contracted condition. The expansion component 80 has a number of wires or strips 81, made of a material of high heat conductivity such as metal, extending from the outer surface of the expansion component 80 into its interior to facilitate heat conduction to the gas sealed in the expansion component. This design is effective, particularly for expansion components made of a material having a relatively low heat conductivity, to permit the expansion component 80 to expand and contract in a faster response to temperature change in the pump chamber.

Figure 12:
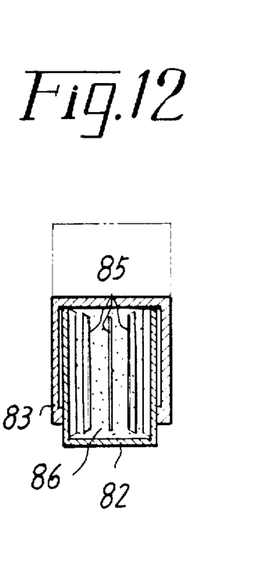
FIG. 12 is a sectional view showing still another modified form of the expansion component.

Referring to FIG. 11, another modified form of the expansion component is illustrated. The expansion component includes a housing 82 and a cover 83 mounted for sliding and sealing movement along the outer surface of the housing 82 to define therewith an expansion chamber in which an expansible fluid, such as air, argon gas, liquefied gas, or a mixture of dry ice and alcohol, is sealed. As shown in FIG. 12, the housing 82 may have a number of heat radiating fins 85 extending inwardly from its inner surface in order to optimize the time response of the expansion bag to temperature change. The heat radiating fins 85 may be made of a metal having a high conductivity and a low density. The expansion bags shown in FIGS. 11 and 12 may be replaced with a gangway bellows formed of metal film.

Figure 13:
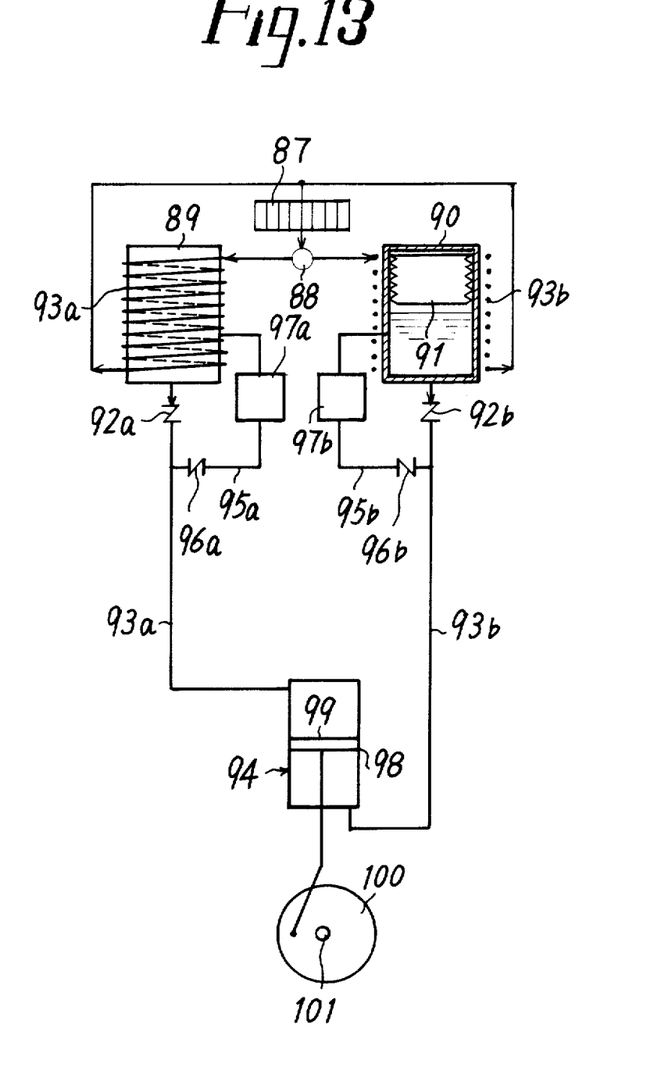
FIG. 13 is a schematic diagram showing a second embodiment of the present invention.

Referring to FIG. 13, there is illustrated an alternative embodiment of the fluid circulating system of the present invention. The system includes first and second expansion contraction vessels 89 and 90 around which first and second spiral pipes 93a and 93b are respectively wound. The reference numeral 87 designates a solar collector which may be similar to the solar collector of FIG. 2. The solar collector 87 is connected to a three-way change-over valve 88 which in turn is connected to the first spiral pipe 93a and also to the second priral pipe 93b. Each of the first and second expansion-contraction vessels 89 and 90 contains an expansion component 91 extensible downward with heat to pressurize the working fluid contained within the expansion-contraction vessel. The expansion component 91 may be in the form of a gangway bellows charged with an expansion fluid expansible with heat. The gangway bellows is made of a material such as laminated metal or the like having a high heat conductivity. The characteristics of the expansion component 91 is selected taking into account the temperatures of the heating fluid required and the working fluid to longitudinally expand it to the full length of the expansion contraction vessel when the heating fluid passes through the spiral pipes and contract it to minimum length when no heating fluid passes therethrough.

The system also includes an output 94 which may be in the form of a cylinder 98 within which a piston 99 is placed for reciprocating movement to define therewith first and second chambers on opposite sides of the piston 99 as a second heat source. The piston 99 is connected to drive a flywheel 100 through a connecting rod. The rotation of the flywheel 100 is transmitted to a suitable device through an output shaft 101. The cylinder first chamber is connected, through an anti-convectional valve 92a, with the first expansion-contraction vessel 89 and also, though an anti-convectional valve 96a to a heat radiator 97a, which in turn is connected to the first expansion-contraction vessel 89. The anti-convectional valve 92a permits flow from the first expansion-contraction vessel 89 to the cylinder first chamber but not vice versa. The anti-convectional valve 96a permits flow from the cylinder first chamber to the heat radiator 97a but not vice versa. Similarly, the cylinder second chamber is connected, through an anti-convectional valve 92b with the second expansion-contraction vessel 90 and also through an anti-convectional valve 96b to a heat radiator 97b which in turn is connected to the second expansion-contraction vessel 90. The anti-convectional valve 92b permits flow from the second expansion-contraction vessel 90 to the cylinder second chamber but not vice versa. The anti-convectional valve 96b permits flow from the cylinder second chamber to the heat radiator 97b but not vice versa. In order to achieve maximum efficiency, it is preferable to equalize the volume of the cylinder first and second chambers, with the piston in its bottom and top dead center positions, respectively, to that of the working fluid in the expansion-contraction vessel with the expansion component in its most contracted position.

The operation is as follows. Assuming now that the change-over valve 88 is in a position connecting the solar collector 87 to the second spiral pipe 93b, the heating fluid is delivered under natural convection from the solar collector to the second spiral pipe 93b. While passing through the second spiral pipe, the heating fluid transfers heat to the expansion component 91 and the working fluid charged in the lower portion of the second expansion-contraction vessel 90. As a result, the expansion component 91 expands to increase the pressure in the second expansion-contraction vessel 90 so as to discharge the working fluid under pressure form the second expansion-contraction vessel 90. The working fluid is delivered through the anti-convectional valve 92b to the cylinder second chamber, moving the piston 99 toward its top dead center position. When the piston 99 reaches its top dead center position, the change-over valve 88 is moved by a suitable switching means (not shown) to the alternate position connecting the solar collector 87 to the first spiral pipe 93a. The switching means may be in the form of a device adapted to change the position of the change-over valve 88 in response to rotation of the flywheel 100 or to movement of the expansion component 91.

The movement of the change-over valve 88 to the causes the heating fluid to circulate through the first spiral pipe 93a so that the working fluid is delivered from the first expansion-contraction vessel 89 to the cylinder first chamber, moving the piston 99 toward its bottom dead center in a manner similar to that described in connection with the second expansion-contraction vessel 90. As a result, the working fluid is discharged from the cylinder second chamber and is delivered through the anti-convectional valve 96b to the heat radiator 97b which releases heat from the working fluid. The cooled working fluid is then delivered from the heat radiator 97b into the second expansion-contraction vessel 90 so as to cool and contract the expansion component 91. When the piston 99 reaches its bottom dead center, the change-over valve 88 is returned to its initial position. These operations are repeated to continuously rotate the flywheel 100.

Figure 14:
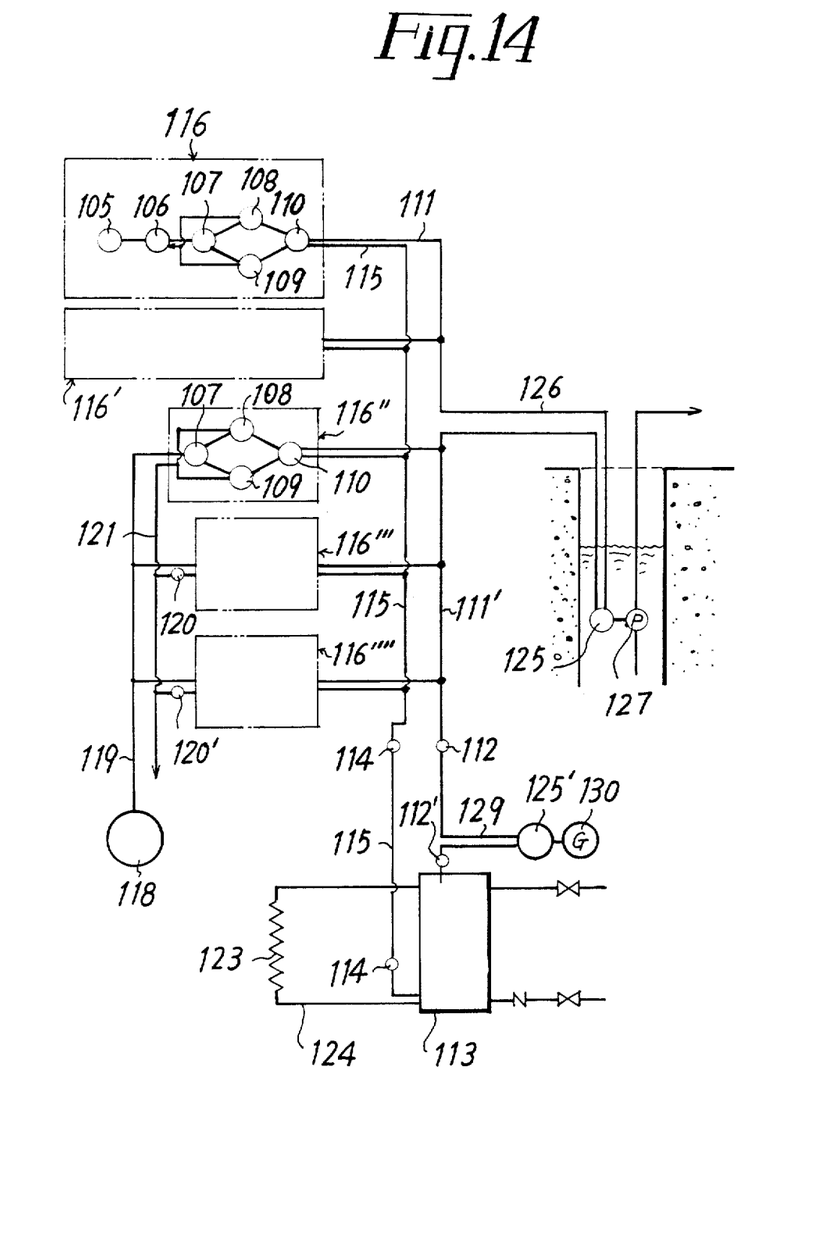
FIG. 14 is a schematic diagram showing a third embodiment of the present invention.

Referring to FIG. 14, there is illustrated a multi-purpose fluid circulating system made in accordance with the teachings of the present invention. Heat from a solar energy source 105 is transmitted to a heat collector 106 wherein a fluid such as water is heated. The heated water is delivered through a change-over valve 107 alternatively to expansion-contraction vessels 108 and 109 wherein heat is transferred to expand their expansion components so as to alternatively discharge working fluid therefrom through a change-over valve 110 to a delivery line 111. The working fluid is then delivered through anti-convectional valve unit 112 to a storage tank 113 placed under the ground. The storage tank 113 is connected through lines 123 and 124 across a heat radiator 123 which is used as an air conditioner or a heater. The cooled working fluid from the storage tank 113 is delivered through a return line 115 having therein anti-convectional valve unit 114 to the change-over valve 110 from which the working fluid is delivered alternatively to the expansion-contraction vessels 108 and 109, thereby alternatively contracting the expansion components therein.

The amount of heating fluid may be increased by connecting another system 116 in parallel with the system 116, the added system 116 including a solar collector 106, a change-over valve 107, expansion-contraction vessels 108 and 109 and, change-over valve 110 all of which are similar to those included in the system 116. To compensate for the solar energy where the solar energy is insufficient, another natural or artificial heat source 118 such as heated water from a hot spring or a factory may be used. In this case, a system 116', including a change-over valve 107', expansion-contraction vessels 108' and 109', and a change-over valve 110', all of which are similar to those included in the system 116, is additionally connected in parallel with the system 116. The hot water from the first heat source 118 is delivered through a line 119 to the change-over valve 107' of the system 116'. The water returned from the expansion-contraction vessels 108' and 109' is discharged to the exterior through a line 121. In order to prevent the hot water from the heat source 118 from entering the storage tank 113 and other systems, the expansion-contraction vessels 108' and 109' of the system 116' are of the type separating the heating fluid from the working fluid. If the capacity of the heat source 118 is greater than that of the system 116', a desired number of similar systems 116' may be additionally connected in parallel with the system 116'. The latter arrangement is effective to increase the pressure under which the working fluid is delivered to the storage tank 113. A shut-off valve 120 may be provided in the vent port of each added system 116', the shut-off valve 120 being operable to shut off the flow of water discharged from the system 116' to the exterior. This is effective to prevent an efficiency drop in the other systems 116' resulting from a decrease in the capacity of the heat source 118 for any reason.

A vane wheel 125, having a rotary shaft coupled to a pump 127, may be connected through 126 to the delivery line 111. The pump 127 may be used to draw water from a well without the need for electric power. Another rotor 125, having a rotary shaft coupled to a generator 130, may be connected through 129 to the delivery line 111 to produce electric power.

Although the present invention has been described in connection with specific embodiments, it is evident that many alternatives, modifications and variations will be apparent to those skilled in the art. Accordingly, it is intended to embrace all alternatives, modifications and variations that fall within the broad scope of the appended claims.

What is claimed is:

1. A fluid circulating system comprising:
   (a) a source of a first fluid, serving as a heat transfer medium;
   (b) first and second closed vessels for containing a second fluid, serving as a working fluid, and having an inlet and an outlet for the working fluid;

(c) expansion means, contained wholly within each of said vessels, for expansion responsive to a temperature increase to displace working fluid from the vessel and contraction responsive to a temperature decrease to draw working fluid into the vessel;

(d) supply means for alternately supplying said first fluid to said first vessel or to said second vessel, said supply means including a changeover valve for switching the supply of first fluid from one of said vessels to another of said vessels, and a (e) working fluid circulation loop, connected at one end to both of said inlets and at the other end to both of said outlets.

2. The system of claim 1 wherein each of said inlets and outlets is provided with a one-way valve.

3. The system of claim 1 further comprising: a heat exchanger within said circulating loop for cooling the working fluid.

4. The system of claim 3 further comprising anti-convection valves upstream and downstream of said heat exchanger.

5. The system of claim 1 further comprising working means, within said circulation loop, for converting the energy of the circulating working fluid to mechanical work.

6. The system of claim 5 further comprising anti-convection valves upstream and downstream of said working means.

7. The system of claim 6 wherein said anti-convection valve comprises:

a housing of a heat-insulating material defining an interior valve chamber and an inlet and an outlet for said valve chamber;

a valve element within said valve chamber, said valve element having a density lower than that of said working fluid;

a valve seat at said valve chamber inlet adapted to prevent fluid flow therethrough when the valve element is seated therein and a valve seat at said valve chamber outlet adapted to permit fluid flow therethrough when the valve element is seated therein.

8. The system of claim 4 wherein said anti-convection valve comprises:

a housing of a heat-insulating material defining an interior valve chamber and an inlet and an outlet for said valve chamber;

a valve element within said valve chamber, said valve element having a density lower than that of said working fluid;

a valve seat at said valve chamber inlet adapted to prevent fluid flow therethrough when the valve element is seated therein and a valve seat at said valve chamber outlet adapted to permit fluid flow therethrough when the valve element is seated therein.

9. The fluid circulating system of claim 1 wherein said expansion means is at least one elastic bag, located in each vessel, charged with a fluid which changes volume responsive to temperature change.

10. The fluid circulating system of claim 1 wherein said expansion means is an expansible fluid which freely mixes with said working fluid within said vessels.

11. The fluid circulating system of claim 1 wherein said expansion means is a net sack and a plurality of ball-shaped, fluid-containing elastic bags contained within said net sack.

12. A fluid circulating system in accordance with claim 1 further comprising a heating coil wrapped around each of said vessels, each heating coil being in fluid communication with said source of heated fluid through said changeover valve.

13. The fluid circulating system of claim 1 wherein each of said vessels contains an interior vessel and each of said interior vessels contains an expansible fluid, said expansible fluid serving as said expansion means, said working fluid being contained within said interior vessel for discharge responsive to heating of the expansible fluid.

14. The fluid circulating system of claim 1 further comprising an actuator for switching said changeover valve responsive to change in the temperature differential between said first and second vessels.

15. The fluid circulating system of claim 14, wherein said actuator comprises:

a cylinder having an interior in fluid communication with said first and second vessels;

a piston mounted within said cylinder interior for reciprocating movement therein and serving to divide the interior of the cylinder into first and second chambers, said piston being operatively connected to said changeover valve.

16. The fluid circulating system of claim 15 further comprising:

additional expansion means in the form of elastic bags contained within said first and second chambers, for expansion or contraction responsive to temperature change.

17. The fluid circulating system of claim 1 wherein said expansion means within the two vessels are identical.

18. The fluid circulating system of claim 7 wherein said valve element is made of an elastic material.

19. The fluid circulating system of claim 1 wherein said heat source includes a solar collector.

20. The system of claim 1 wherein said expansion means comprises a fluid.

* * * * *